Jan. 6, 1942.        N. ROHATS        2,269,226
CATHODE RAY OSCILLOGRAPH CONTROL
Filed Nov. 15, 1940
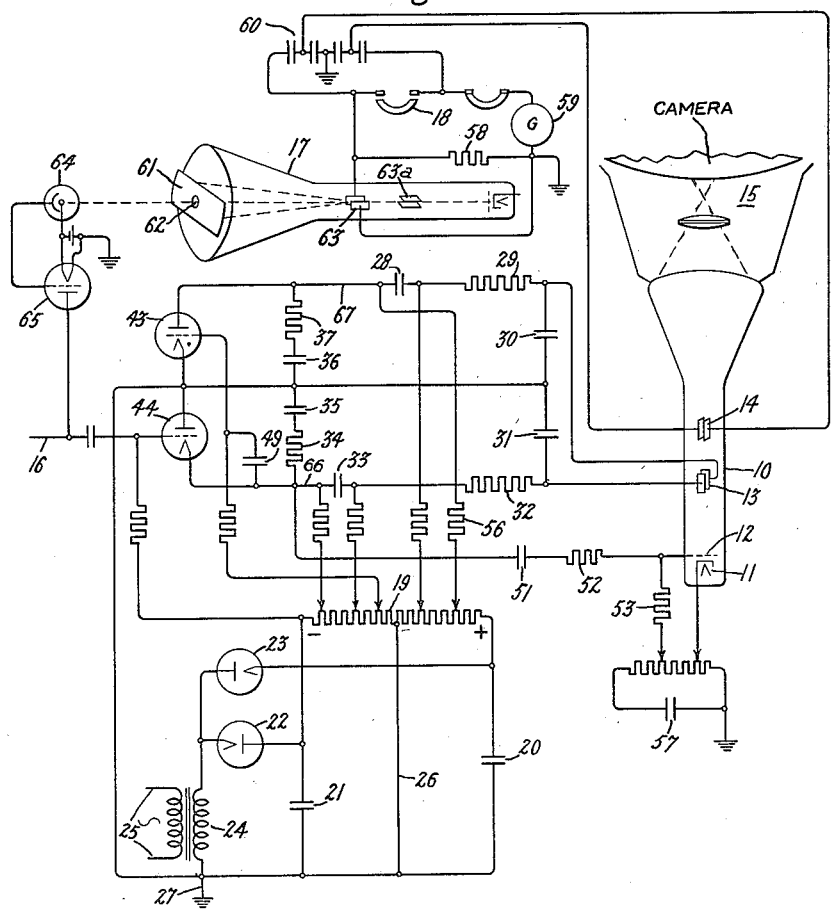
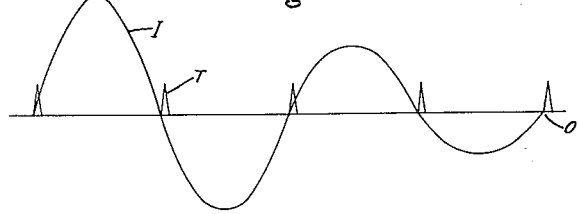
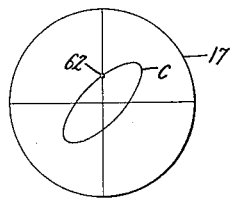
Inventor:
Nicholas Rohats,
by Harry E. Dunham
His Attorney.

Patented Jan. 6, 1942

2,269,226

UNITED STATES PATENT OFFICE 2,269,226

CATHODE RAY OSCILLOGRAPH CONTROL

Nicholas Rohats, Scotia, N. Y., assignor to General Electric Company, a corporation of New York Application November 15, 1940, Serial No. 365,783

3 Claims. (Cl. 171—95)

My invention relates to a method of and apparatus for automatically controlling cathode ray oscillographs when employed for the recording of very high speed phenomena. A feature of my invention is a sweep wave generator having a very quick recovery characteristic such that after each recording operation the apparatus is quickly reconditioned for a subsequent recording operation. Thus, by means of my apparatus the successive surges of a lightning stroke may be individually recorded. Another important feature of my invention concerns a method of initiating recording operations at selected adjustable points of a current or voltage surge.

The features of my invention which are believed to be novel and patentable will be pointed out in the claims appended hereto. For a better understanding of my invention, reference is made in the following description to the accompanying drawing in which Fig. 1 shows a complete wiring diagram of my sweep wave generator as connected to initiate recording operation of one oscillograph at a time selected by an auxiliary oscillograph; Figs. 2 and 3 are curves explanatory of the controlling action of such auxiliary oscillograph.

Referring now to the main wiring diagram of Fig. 1, 10 represents a cathode ray oscillograph having a cathode at 11, a control grid at 12, time axis sweep plates at 13, and deflection plates at 14 at right angles to plates 13 and across which the surge voltage to be recorded is impressed. Associated with the screen end of the oscillograph is represented a high speed camera 15 for recording the trace of the cathode ray beam. The details of construction of the cathode ray tube and of the high speed camera are not features of my invention. It is sufficient to point out that in using my invention, the cathode at 11 is maintained in an alert or heated condition ready to strike a cathode ray beam the instant the proper initiating impulse voltage is applied to control grid 12, which beam will be extinguished when the impulse voltage on control grid 12 disappears or is reduced below a certain value. Also, that the high speed camera is intended to be of a type having a continuously rotating film holder so as to record several successive operations of the cathode ray oscillograph as and when it is operated.

The circuit network shown in the central portion of Fig. 1 comprises a sweep wave or time axis generator and its connection with the cathode ray initiation circuit. A special source of supply for the time axis generator is included in the lower portion of the network illustrated. This sweep wave generator is so designed, for example, that the apparatus will individually record as separate and distinct operations the various discharges of a lightning stroke that may be made up of a dozen separate discharges in the space of a second, but with time intervals between separate discharges of the order of several milli-seconds.

The initiating impulse is applied at point 16 and the phenomena to be recorded is applied across the deflection plates 14. In Fig. 1 I have shown connections for initiating a recording operation from a second cathode ray oscillograph tube 17, and the plates 14 connected to respond to the recovery voltage of a circuit breaker 18. The second tube 17 is here used to initiate the operation of the first mentioned oscillograph tube at a selected point in the wave of the short circuit current which is interrupted by the circuit breaker 18.

The important parts of the apparatus will now be described in more detail. The supply for the sweep wave or time axis generator is obtained from a potentiometer resistance 19 across which a voltage is maintained by condensers 20 and 21, charged through rectifiers 22 and 23 and a transformer 24 from an ordinary A.-C. supply 25. The central point of the resistance 19 is connected by a wire 26 to a connection between the condensers 20 and 21 and is also grounded at 27. The connection 26 serves to maintain the charge on the two condensers and the voltage drop across the two halves of the resistance 19 equalized and the maximum voltage above ground at a minimum.

The time axis or sweep wave generator circuit contains condenser 28, resistance 29, condensers 30 and 31, resistance 32, condenser 33, and tubes 44 and 43. Also impedance consisting of condensers 35, 36, and resistances 34, 37 which serve only to stabilize the operation of the tubes 43 and 44 by increasing the otherwise small current flow through them from the rest of the circuit. It will be noted that the circuit elements are symmetrical with respect to ground except for polarity. The condensers in this circuit are maintained charged to proper potentials by being connected across selected portions of voltage divider resistance 19 as shown. The time axis sweep plates 13 are connected across condensers 30 and 31.

Circuit operation is as follows: The electric discharge devices of the gaseous type 43 and 44 are non-conducting in the steady state condition but become conductive when ionized by a positive impulse applied at point 16. As tube 44 is ionized it drops the potential of lead 66 to very nearly ground potential in a small fraction of a microsecond. As 66 is negative in polarity this drop in potential is similar to applying a positive impulse to any condensers connected to it. Taking condenser 49 as an example, it has a certain charge associated with its potential. This charge cannot be suddenly annihilated as it represents a certain amount of energy which must be dissipated by current flowing out of it. Therefore, as the negative side of condenser 49 is reduced to zero, its positive side will be correspondingly elevated. This sudden increase of potential on the positive side of condenser 49 causes tube 43 to ionize and drop lead 67 to nearly ground potential similarly to the action of tube 44 on lead 66. Then by the theory as described for condenser 49 a readjustment of potentials occurs on condensers 28, 33 and 51. In the case of 28 and 33 this change in potential and polarity will cause current to flow out of condensers 30 and 31 regulated by resistors 29 and 32, and so produce the time axis deflection. In the case of condenser 51, current is caused to flow up through resistances 53 and 52 so that the negative bias on control grid 12 is reduced sufficiently to establish the cathode beam.

The length of the sweep is determined by circuit constants and also by the time the tubes 43 and 44 remain ionized. By making capacitors 35 and 36 and their series resistors 34 and 37 of suitable values, this ionization period of the tubes may be adjusted to match the period of the sweep. As soon as the thyratrons 43 and 44 deionize, the cathode beam is cut off and the various capacitors begin recharging. As capacitors 30, 31, 35, 36 and 51 are small, they can recharge rapidly from the large energy storage in 20 and 21. Capacitors 28 and 33 are fairly large, but lose only a small part of their charge during a sweep operation so that they too recharge quickly.

The arrangement described will start recording in less than one-half microsecond after the start of a surge impulse impressed on terminal 16, and will recover its original waiting condition in a minimum of about 700 microseconds. Hence it is possible to individually record the several surges of a multiple surge lightning stroke or the like. For such purpose, the photosensitive film of the camera 15 may be moving several feet per second, but this motion is so slow as compared to the rapidity at which a record is flashed on the screen that the records have practically the same appearance as they would have if taken on a stationary film except they do not overlap to the extent of being confusing.

The quick tripping and rapid recovery action of the apparatus referred to above may be obtained with circuit constants corresponding to the following data given as one possible combination and not by way of limiting the invention. Condensers 20, 21, 28 and 33 each .5 microfarad. Condensers 30, 31 and 51 each .001 microfarad. Condensers 35 and 36 each .0005 microfarad and condenser 49 about .0001 microfarad. The resistance 19 may have a total resistance of 10 million ohms, resistances 29 and 32 about 50,000 ohms each, resistances 34 and 37 about 100 ohms each. The resistances in the potentiometer leads such as the resistance 56 may be 100,000 ohms each. The resistances at 52 and 53 may be of the order of 1,000,000 and 50,000 ohms when using a 15 kilovolt condenser at 57. In the steady state condition the voltage across the potentiometer resistance 19 may be of the order of 6000 volts. As mentioned above, the operating characteristics may be changed by changing the circuit constants.

The operating characteristics thus obtained permits the apparatus to be used for a variety of purposes, one of which, using a novel manner of controlling the tripping of the apparatus, will now be described.

In the upper portion of Fig. 1 is shown a second cathode ray tube 17 having sweep plates connected across a resistance 58 in the load circuit of a generator 59. This load circuit is adapted to be opened and closed by one or more circuit breakers under test. In the present case it is proposed to test the recovery voltage across the circuit breaker 18 when it interrupts an alternating load current and for this purpose the plates 14 of the main oscillograph tube are connected across the breaker by means of capacitance voltage divider 60.

Invariably when an alternating current is being interrupted by an ordinary switch or circuit breaker, an arc is established as the contacts open which may persist for a few cycles, but final current interruption occurs when the alternating current is passing through a zero value. In order to obtain a good record of the following recovery voltage it is desirable to initiate operation of the recording oscillograph at the instant current flow ceases. Hence, I have provided the special oscillograph 17 to initiate recording operations of the main oscillograph 10 each time the current in the load circuit of generator 59 passes through a zero value during the test. For this purpose an opaque screen or shutter 61 is provided over the screen end of tube 17, the shutter having a restricted window or opening 62 therein and being adjustable to position such opening at any desired point in the path of the cathode ray beam as it is swept across the screen by the deflection plates at 63 in response to the reversals of current flow through resistance 58 in the load circuit of the circuit breaker under test. Shutter 61 is thus adjusted to pass the cathode ray beam when the current of the load circuit is passing through zero in either direction or in other words, when the load current is zero or approximately so.

In the path of the beam passed by orifice 62 of shutter 61 is a photo cell 64 sensitive to the light ray and the response of which may be suitably amplified by a tube 65, if necessary, and impressed upon the trip terminal 16 of the main tube control circuit previously described. If the beam is sufficiently condensed the shutter may be dispensed with and the cell 64 alone adjusted to the desired position. Thus, each time the load current through resistance 58 passes through a zero value the main tube is tripped and records if there is anything to record. This controlling action may be pictured by means of the curve of Fig. 2 where curve I is assumed to be the current flow through resistance 58 during a current interrupting operation. This current is shown as decreasing and is finally interrupted at point 0. The small peaks T may represent the tripping and recovery of the main oscillograph. When the current I is interrupted at 0, the beam of the auxiliary tube remains on the photo cell 64 and no further tripping can occur.

It is therefore evident that the main oscillograph was caused to record whatever happened at each zero of the short circuit current wave. It is evident that by shifting the shutter 61, tripping may be made to occur at any desired point or points in a current or voltage wave. The tube 17 may have additional plates 63a to give the beam an elliptical path in desired cases to initiate recording operations only when the surge under investigation is at a certain value and varying in a given direction positive or negative. Thus in Fig. 3 let the ellipse C represent the trace of the cathode ray and 62 represent the controlled position of the orifice shutter. By moving the orifice 62 about the ellipse, magnified records of various parts of a recurring surge may be made in great detail in the manner outlined.

What I claim as new and desire to secure by Letters Patent of the United States is:

1. A cathode ray oscillograph having control electrodes, control apparatus for initiating the operation of said cathode ray oscillograph at a selected time in the cycle of a cyclic varying phenomenon, comprising in combination with said oscillograph a second cathode ray oscillograph so operated as to cause its ray to be oscillated synchronously with such cyclic varying phenomenon, a photoelectric tube positioned so as to intercept such ray only at a selected point in its oscillation, means controlled by said tube in response to such ray interception for producing an electrical impulse, circuits including condensers having connections to the control electrodes of the first mentioned oscillograph, means for normally maintaining said condensers under predetermined charged conditions and electron discharge means ionized in response to such electrical impulse for disturbing the predetermined charged conditions of said condensers to thereby initiate operation of the first mentioned oscillograph.

2. A sweep voltage generator for cathode ray oscillographs comprising a closed circuit made up of two symmetrical halves each half comprising a condenser, a resistance, a larger condenser and an impedance connected in series in the order named, the two halves being connected in series with a ground connection between them at both connection points, sweep voltage terminals across the two first mentioned condensers, a resistance grounded at a central point across which a high direct current potential is maintained, means for connecting said larger condensers across selected points of said resistance to normally maintain the condensers in the closed circuit in a steady state charged condition in a direction tending to cause a current flow in the same direction through said closed circuit, normally deionized electric discharge devices connected in series across the impedance portions of said closed circuit and with a ground connection between the devices, said devices having control grids, means for impressing a signal on the control grid of one device to ionize it, a connection to the control grid of the other device for causing its ionization as soon as the first device is ionized, the ionization of said device short-circuiting said impedance portions of said closed circuit to partially discharge the condensers and produce a sweep voltage across the sweep voltage terminals, the constants of said circuit being such that the condensers may return to the steady state charged condition in not less than about 700 microseconds after said electric discharge devices are deionized.

3. A cathode ray tube control system comprising in combination with a varying current electric circuit a cathode ray tube connected to record a phenomenon of said circuit, means for controlling the ignition of said cathode ray tube at a selected value of current in said circuit comprising an ignition circuit for said tube, a second cathode ray tube connected to said current circuit so as to deflect its cathode ray in accordance with the current variations therein, and a photocell positioned to intercept the ray of said cathode ray tube at such selected value of current of said current circuit and connected for activating said ignition circuit when said photocell is energized.

NICHOLAS ROHATS.